US012142874B2

(12) United States Patent
Yoshida et al.

(10) Patent No.: US 12,142,874 B2
(45) Date of Patent: Nov. 12, 2024

(54) CONNECTOR CONNECTION STRUCTURE

(71) Applicant: Yazaki Corporation, Tokyo (JP)

(72) Inventors: Haruki Yoshida, Makinohara (JP); Jumpei Hayashi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 358 days.

(21) Appl. No.: 17/879,079

(22) Filed: Aug. 2, 2022

(65) Prior Publication Data

US 2023/0039294 A1 Feb. 9, 2023

(30) Foreign Application Priority Data

Aug. 4, 2021 (JP) ................................ 2021-128513

(51) Int. Cl.

*H01R 9/05* (2006.01)
*H01R 13/52* (2006.01)
*H01R 13/6592* (2011.01)
*H01R 13/6596* (2011.01)
*H01R 13/74* (2006.01)

(52) U.S. Cl.

CPC ..... *H01R 13/5202* (2013.01); *H01R 13/6592* (2013.01); *H01R 13/6596* (2013.01); *H01R 13/74* (2013.01)

(58) Field of Classification Search

CPC ............ H01R 13/5202; H01R 13/6592; H01R 13/6596; H01R 13/74
USPC ............................................ 439/579, 607.25
See application file for complete search history.

(56) References Cited

U.S. PATENT DOCUMENTS

| | | | | |
|---|---|---|---|---|
| 5,429,529 | A | 7/1995 | Hashizawa et al. | |
| 6,262,374 | B1 | 7/2001 | Matsumoto et al. | |
| 2003/0104729 | A1 | 6/2003 | Endoh | |
| 2020/0313344 | A1* | 10/2020 | Araki ................ | H05K 7/20127 |
| 2023/0143547 | A1* | 5/2023 | Watanabe ............. | H01R 13/52 439/135 |

FOREIGN PATENT DOCUMENTS

| | | | |
|---|---|---|---|
| JP | 6-260246 | A | 9/1994 |
| JP | 11-74030 | A | 3/1999 |
| JP | 2000-123924 | A | 4/2000 |
| JP | 2003-168879 | A | 6/2003 |
| JP | 2016-76438 | A | 5/2016 |

* cited by examiner

*Primary Examiner* — Phuong K Dinh
(74) *Attorney, Agent, or Firm* — Sughrue Mion, PLLC

(57) ABSTRACT

A connector connection structure includes: a first connector; a second connector electrically connected to the first connector; a unit to which the first connector is ground-connected; and a seal member sealing a gap between the first connector and the unit. The unit has a hole portion that includes a first portion and a second portion having a diameter smaller than a diameter of the first portion. The first connector includes shield shell provided with a contact portion having a contact part that is to abut an inner peripheral surface. A radius of the first portion is larger than a distance from a central axis of an electric wire of the first connector to a contact part in a neutral state. A core wire of the electric wire is electrically connected to a terminal portion of the second connector via a terminal portion of the first connector.

9 Claims, 10 Drawing Sheets

CONNECTOR CONNECTION STRUCTURE

CROSS-REFERENCE TO RELATED APPLICATIONS

This application is based on and claims priority under 35 USC 119 from Japanese Patent Application No. 2021-128513 filed on Aug. 4, 2021, the contents of which are incorporated herein by reference.

TECHNICAL FIELD

The present disclosure relates to a connector connection structure.

BACKGROUND ART

Many vehicle-mounted devices such as a motor are mounted on a vehicle such as an automobile, and the influence of electromagnetic waves generated from these devices cannot be ignored. In addition, the influence of electromagnetic waves generated from an electric wire for a large current or high voltage cannot be ignored. Although countermeasures vary depending on the source of the electromagnetic waves and the type of the electromagnetic waves, the influence of the electromagnetic waves of a vehicle-mounted device or the like is suppressed by various methods. For example, in the related art, there has been proposed a connector that is to be mounted on a vehicle and has excellent shielding performance for blocking electrical noise such as electromagnetic waves and static electricity generated from an electric wire (see, for example, JP2016-076438A).

JP2016-076438A discloses a connector including an electric wire covered with a braid, a terminal portion connected to an end of the electric wire, a housing accommodating the terminal portion, and a shield shell externally attached to the housing. Such a connector in the related art is configured to be inserted into a hole portion provided in a casing of an electronic control unit or the like to be connected to a mating connector or the like accommodated in the casing, the shield shell is fixed to the casing, and the connector is ground-connected to the casing.

In a connector in the related art, from the viewpoint of sealing performance, a gap between a housing and an electric wire is sealed by a rubber plug externally attached to the electric wire. As described above, although the connector in the related art is configured to suppress water intrusion into the connector, there is room for further improvement.

SUMMARY OF INVENTION

The present disclosure provides a connector connection structure having excellent sealing performance.

A connector connection structure includes: a first connector; a second connector electrically connected to the first connector; a unit to which the first connector is ground-connected; and a seal member configured to seal a gap between the first connector and the unit. The unit has a hole portion. The hole portion includes a first portion that is located on one side of the hole portion, and a second portion that is located on the other side of the hole portion with respect to the first portion and the second portion has a diameter smaller than a diameter of the first portion. The first connector includes a terminal portion to be inserted into the hole portion, a housing accommodating the terminal portion, an electric wire to which the terminal portion is connected at one end, and a shield shell provided with a contact portion having a contact part that is to abut an inner peripheral surface of the second portion, and is electrically connected to the second connector via the hole portion. The electric wire includes a core wire connected to the terminal portion, a first insulating coating covering an outer periphery of the core wire, a shield member covering an outer periphery of the first insulating coating, and a second insulating coating covering an outer periphery of the shield member so that a part of the shield member is exposed to an outside. The seal member is positioned between the housing and an inner peripheral surface of the first portion. In the connector connection structure, a radius of the first portion is larger than a distance from a central axis of the electric wire to the contact part of the contact portion in a neutral state, the part of the shield member exposed to the outside is connected to the shield shell, and the contact part of the contact portion abuts the inner peripheral surface of the second portion, so that a ground connection between the shield member and the unit is established. The core wire is connected to the terminal portion of the first connector and the terminal portion of the first connector is connected to a terminal portion of the second connector, so that the core wire is electrically connected to the terminal portion of the second connector.

The present disclosure has been briefly described as above. Details of the present disclosure will be further clarified by reading through a mode for carrying out the disclosure described below with reference to the accompanying drawings.

DESCRIPTION OF EMBODIMENTS

Embodiment

Figure 1:
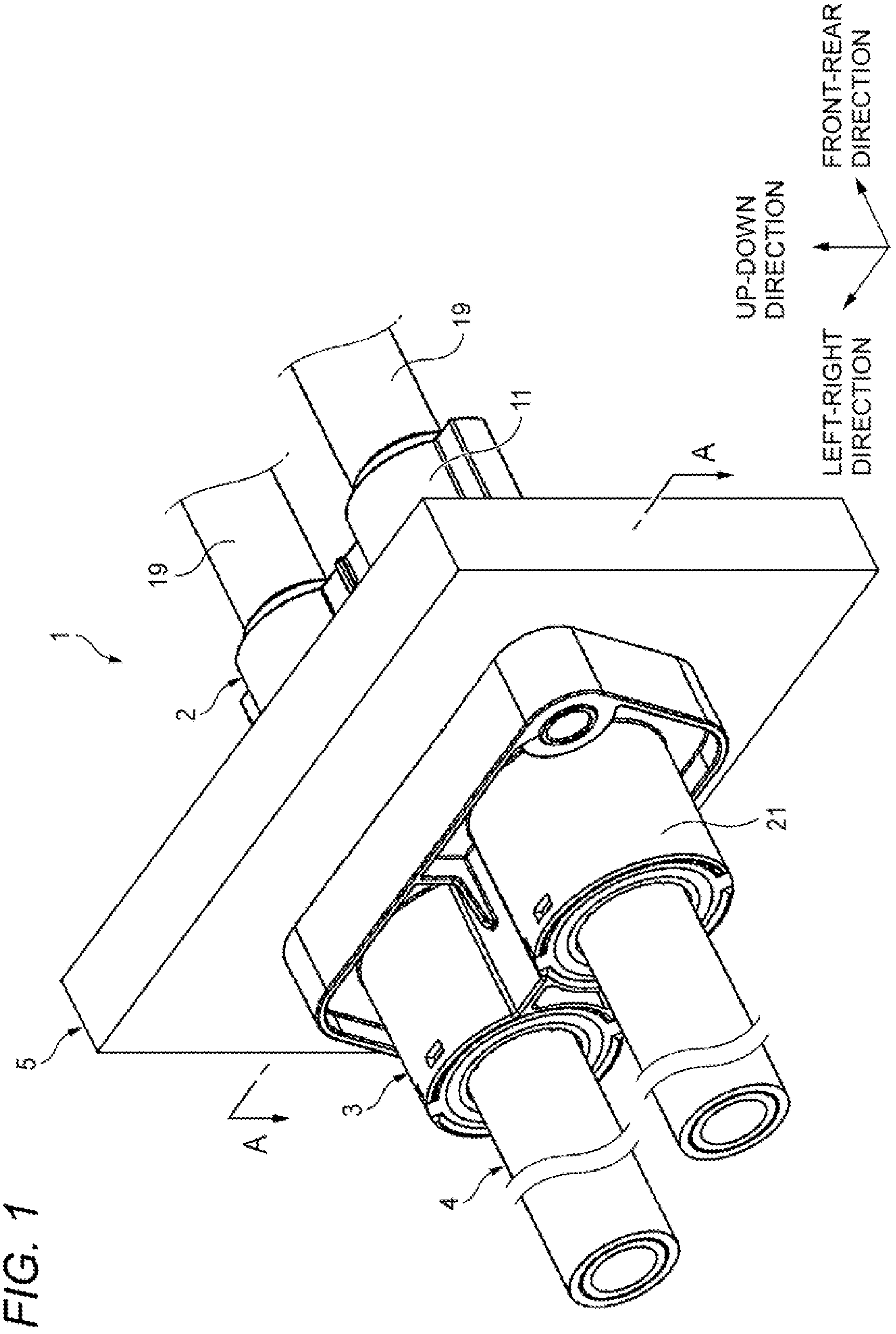
FIG. 1 is a perspective view of a connector connection structure according to an embodiment of the present disclosure.

Hereinafter, a connector connection structure 1 according to an embodiment of the present disclosure will be described with reference to the drawings. The connector connection structure 1 illustrated in FIGS. 1 and 2 includes a female connector 3, a male connector 2, a unit 5, and a packing 28.

The unit 5 is a shield case or the like to which the female connector 3 is ground-connected. In the connector connection structure 1 of this configuration, the conductive connection between the female connector 3, which is connected to an external device, and the male connector 2, which is accommodated in the unit 5 and connected to an electronic device in the unit 5, is established with the unit 5 interposed therebetween. The female connector 3 corresponds to a "first connector" of the present disclosure, the male connector 2 corresponds to a "second connector" of the present disclosure, and the packing 28 corresponds to a "seal member" of the present disclosure.

Hereinafter, for convenience of description, as illustrated in FIGS. 1 to 9B, a "front-rear direction", an "up-down direction", a "left-right direction", "front", "rear", "up", "down", "right", and "left" are defined. The "front-rear direction", the "up-down direction", and the "left-right direction" are orthogonal to one another. The front-rear direction corresponds to a direction in which a terminal portion 22 of the female connector 3 is inserted into a hole portion 44 of the unit 5.

First, the male connector 2 will be described. As illustrated in FIGS. 1 to 4, 5A and 5B (particularly FIGS. 5A and 5B), the male connector 2 includes a housing 11 and a pair of male terminals 12. The housing 11 includes a main body portion 111, a pair of fitting grooves 113, and a pair of terminal accommodating chambers 114.

Figure 5A:
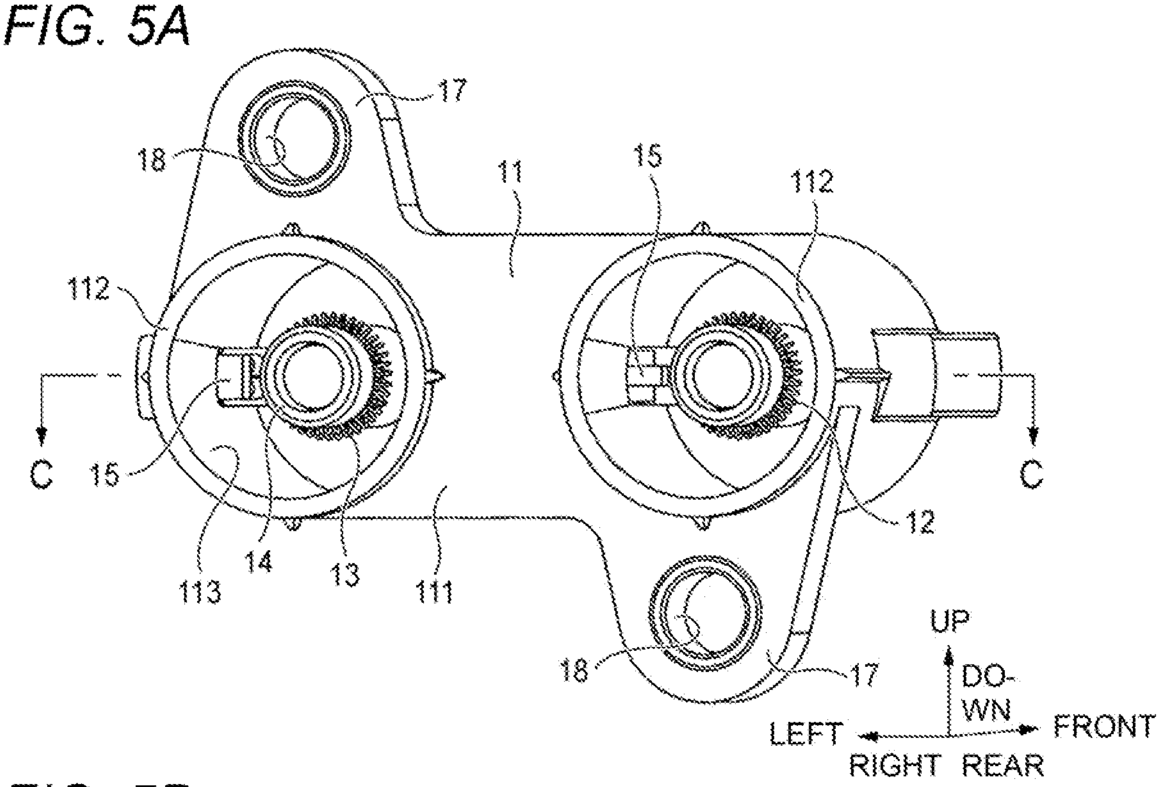
FIG. 5A is a perspective view of a male connector.
Figure 5B:
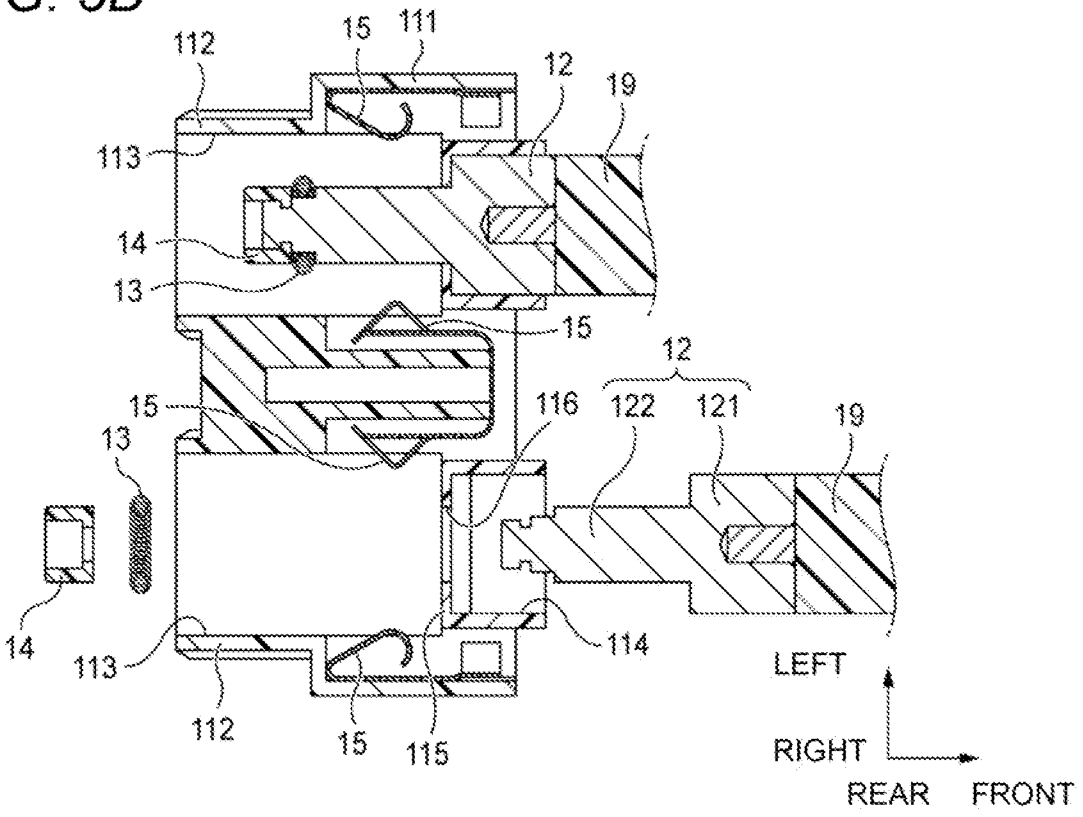
FIG. 5B is a partial exploded view corresponding to a C-C cross-sectional view of FIG. 5A.

As illustrated in FIGS. 5A and 5B, the fitting groove 113 is a groove recessed in a substantially cylindrical shape from a rear end face of the main body portion 111 toward a front side. An opening end 112 of the fitting groove 113 is provided so as to protrude rearward from the rear end face of the main body portion 111. In this example, the pair of fitting grooves 113 are provided side by side at an interval in the left-right direction.

The terminal accommodating, chamber 114 is a groove recessed in a substantially cylindrical shape from a front end face of the main body portion 111 toward a rear side. In this example, the terminal accommodating chamber 114 is provided so as to be adjacent to the fitting groove 113 in the front-rear direction with a wall portion 115, which is a bottom wall of the fitting groove 113, interposed therebetween. In other words, the wall portion 115 serves as both the bottom wall of the fitting groove 113 and a bottom wall of the terminal accommodating chamber 114. The wall portion 115 is provided with a hole portion 116 through which an insertion portion 122 of the male terminal 12 is inserted. In other words, the fitting groove 113 and the terminal accommodating chamber 114 communicate with each other through the hole portion 116.

The housing 11 includes a pair of contact portions 15 located in each fitting groove 113. The contact portion 15 is made of a conductive material. When the male connector 2 and the female connector 3 are fitted to each other, the contact portion 15 is brought into contact with and electrically connected to a conduction ring 30 provided in the female connector 3 to be described later. The contact portion 15 is also electrically connected to a detection circuit (not shown) that is provided on a right side of the paper surface with respect to the male connector 2 in FIG. 5B. As described above, when the contact portion 15 and the conduction ring 30 of the female connector 3 are electrically connected to each other, a conduction state (conduction, non-conduction, or the like) between the male connector 2 and the female connector 3 is detected by the detection circuit.

Flange portions 17 are provided on a rear end side of the main body portion 111. Each flange portion 17 has a fastening hole 18. A fastening member (not shown) is inserted through the fastening hole 18 when the male connector 2 is fastened and fixed to the unit 5.

The male terminal 12 includes a main body portion 121 accommodated in the terminal accommodating chamber 114, and the insertion portion 122 inserted through the hole portion 116 to be positioned in the fitting groove 113. A spring 13 is attached on a rear end side of the insertion portion 122. Conductive connection between the male terminal 12 and a female terminal 22 of the female connector 3 is established via the spring 13 attached on the rear end side of the insertion portion 122 (particularly, see FIGS. 3 and 4).

A front end portion of the main body portion 121 is connected to a rear end side end of an electric wire 19, and thus is electrically connected to an electronic device or the like connected to a front end side end of the electric wire 19. An insulating cap 14 is attached to a rear end portion of the insertion portion 122. The insulating cap 14 is made of an insulating material, and is disposed on the rear side of the spring 13. In the male terminal 12, the insulation cap 14 is attached on the rear side of the spring 13, so that the spring 13 is prevented from falling off from the insertion portion 122.

The above is the description of the male connector 2.

Figure 2:
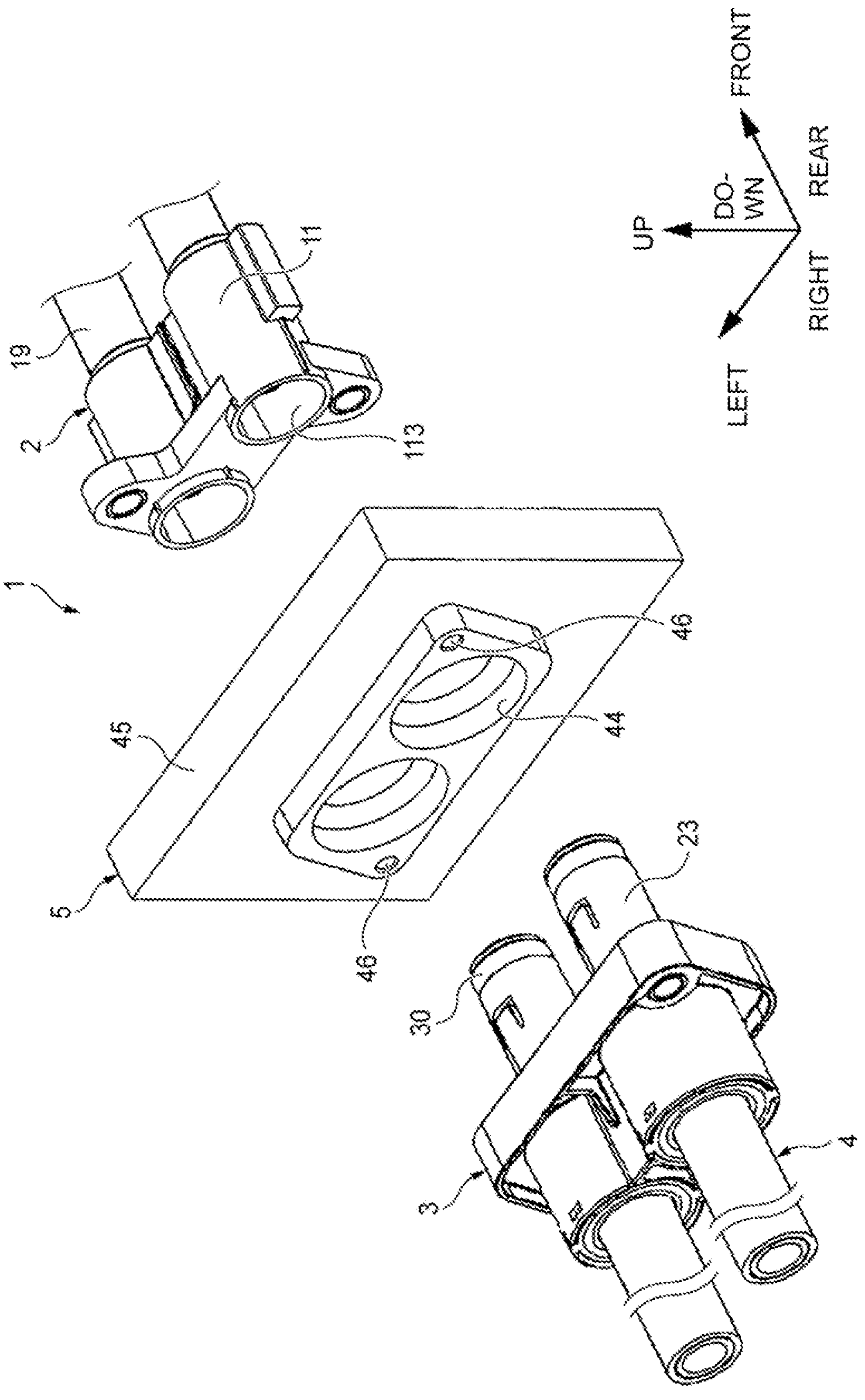
FIG. 2 is an exploded perspective view of a main part in FIG. 1.
Figure 3:
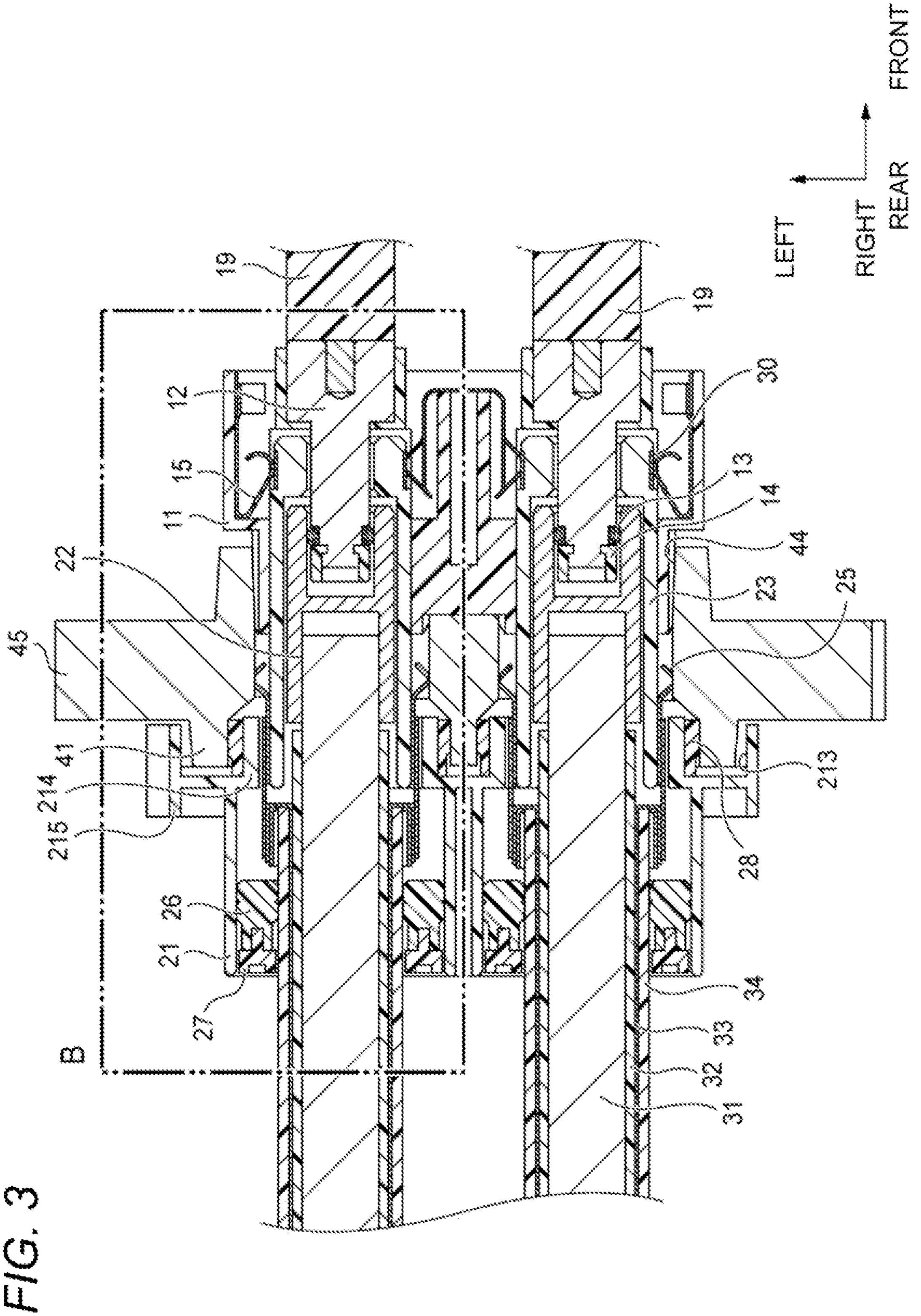
FIG. 3 is a cross-sectional view taken along a line A-A of FIG. 1.
Figure 4:
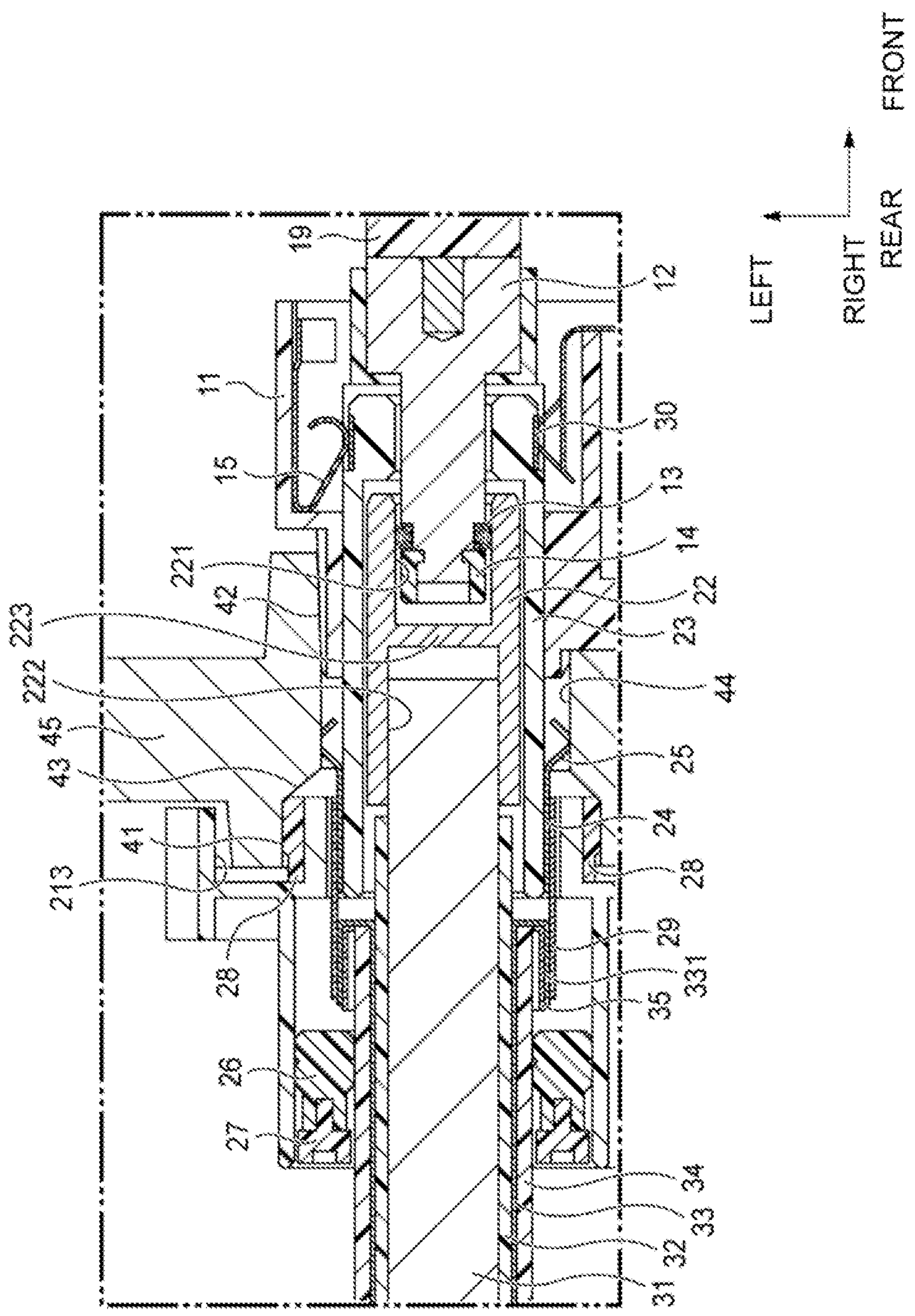
FIG. 4 is an enlarged view of a part B in FIG. 3.

Next, the unit 5 will be described. The unit 5 is made of a conductive material and is disposed between the male connector 2 and the female connector 3. As illustrated in FIGS. 2 to 4, the unit 5 includes a wall portion 45 and a pair of hole portions 44 provided in the wall portion 45 and penetrating the wall portion 45 in the front-rear direction. The unit 5 according to the present embodiment is a shield case or the like. That is, the wall portion 45 of the unit 5 is a peripheral wall of a shield case or the like.

The hole portion 44 has a substantially cylindrical shape. In particular, as illustrated in FIGS. 3 and 4, the opening end 112 of the fitting groove 113 of the male connector 2 is inserted into the hole portion 44 from the front side in the front-rear direction, and a front end portion including the female terminal 22 of the female connector 3 is inserted through the hole portion 44 from the rear side.

The hole portion 44 includes a first portion 41 located on the rear side, a second portion 42 located on the front side of the first portion 41 and having a diameter smaller than that of the first portion 41, and a third portion 43 located between the first portion 41 and the second portion 42 and having a diameter decreasing from the rear side toward the front side.

The first portion 41 is an opening end on the rear side of the hole portion 44, and protrudes toward the rear side from the wall portion 45. That is, the first portion 41 has an annular shape and is a protrusion protruding toward the rear side from the wall portion 45. The first portion 41 is inserted into a recess 213 of the female connector 3, which will be described later.

A front end of the second portion 42, which is an opening end on the front side of the hole portion 44, protrudes from the wall portion 45 toward the front side. That is, the front end of the second portion 42 has an annular shape and is a protrusion protruding toward the front side from the wall portion 45. When the insertion of the female connector 3 into the hole portion 44 is completed, an inner peripheral surface of the second portion 42 comes into contact with a contact portion 25 of the female connector 3 to be described later, and the unit 5 and the female connector 3 are ground-connected.

In the unit 5, fastening holes (not shown) are provided at positions corresponding to the fastening holes 18 of the male connector 2 on a front end face of the hole portions 44. A fastening member (not shown) is inserted into the fastening hole in the front end face of the hole portion 44 when the unit 5 and the male connector 2 are fastened and fixed to each other.

In the unit 5, fastening holes 46 are provided at positions corresponding to fastening holes 216 of the female connector 3 to be described later on a rear end face of the hole portions 44 (particularly, see FIG. 2). A fastening member (not shown) is inserted through the fastening hole 46 when the unit 5 and the female connector 3 are fastened and fixed to each other.

The above is the description of the unit 5.

Next, the female connector 3 will be described. As illustrated in FIGS. 1 to 4 and 6 (in particular, FIG. 6), the female connector 3 includes a housing 21 and a pair of female terminals 22. The housing 21 includes a pair of first tubular portions 211, a flange portion 212, and a pair of second tubular portions 23.

Figure 6:
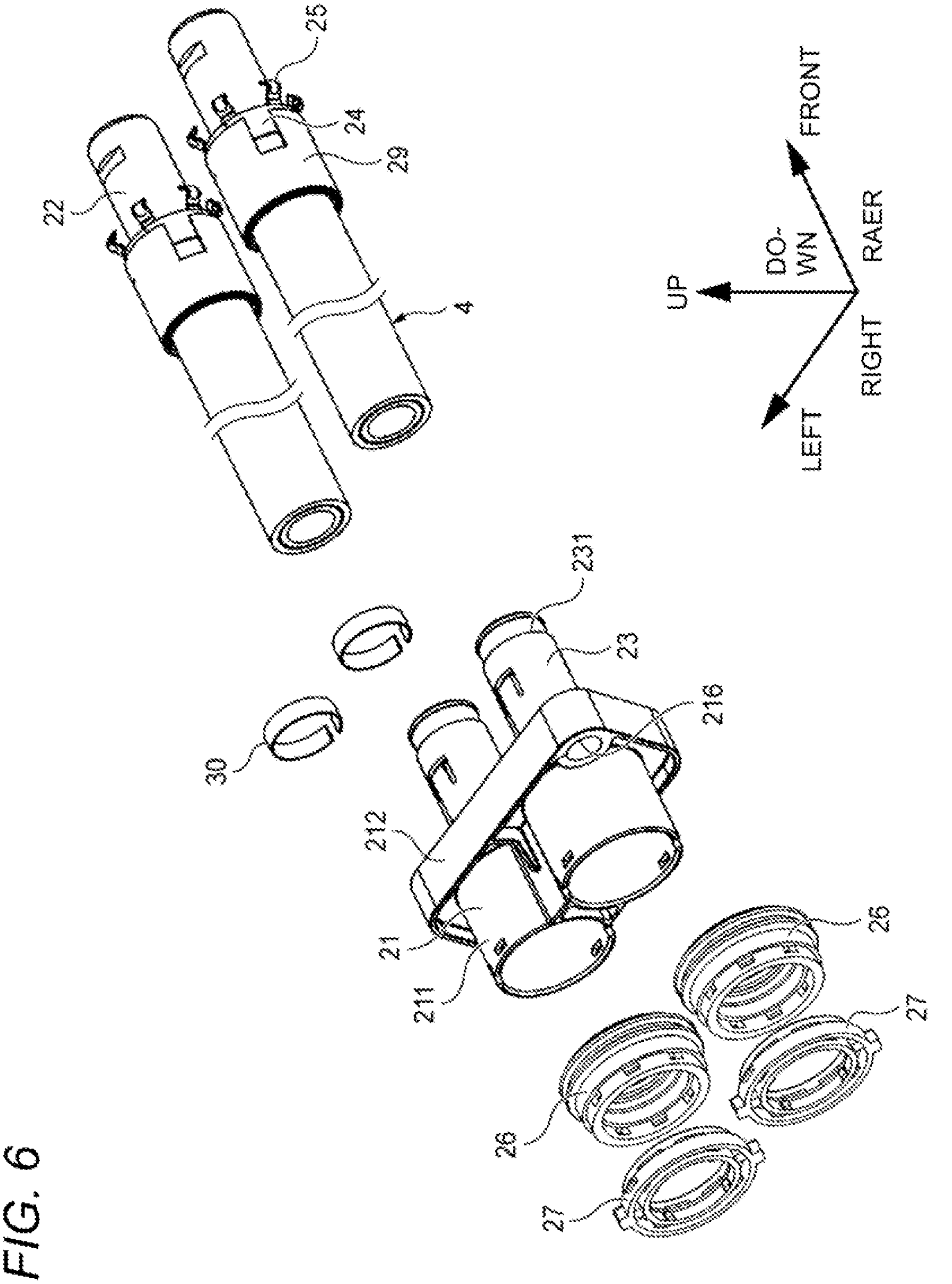
FIG. 6 is an exploded perspective view of a main part of a female connector.
Figure 7A:
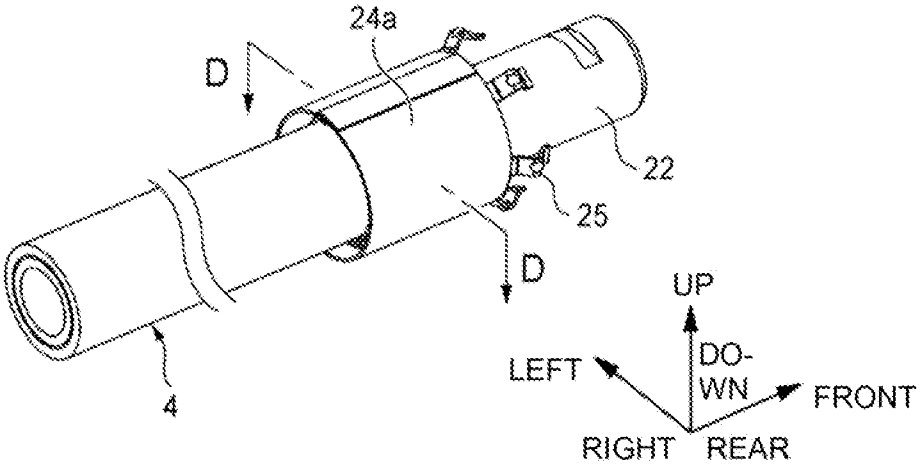
FIG. 7A is a perspective view of a wire harness according to another embodiment.
Figure 7B:
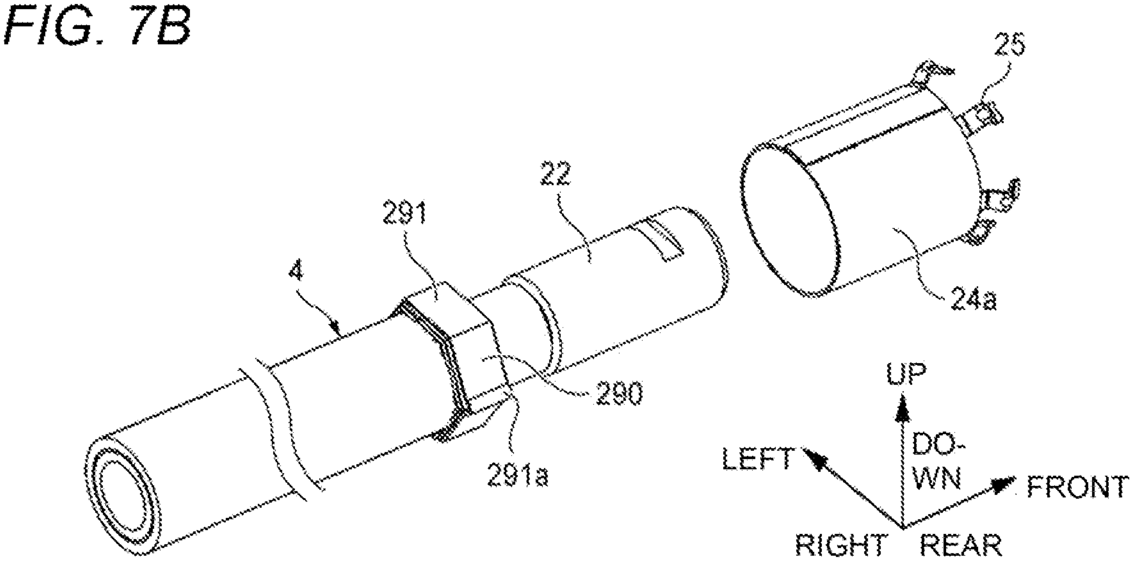
FIG. 7B is an exploded perspective view of a main part of FIG. 7A.

As illustrated in FIG. 6, the first tubular portion 211 has a substantially cylindrical shape. In this example, the pair of first tubular portions 211 are provided side by side along the left-right direction. The substantially rectangular flange portion 212 is provided on the front side of the first tubular portion 211. A peripheral edge of the flange portion 212 has a hood portion 215 extending by a short distance to the front side and the rear side. In other words, the hood portion 215 has a substantially rectangular shape extending toward the front side from the peripheral edge of the flange portion 212 and opening toward the front side, and has a substantially rectangular shape extending toward the rear side from the peripheral edge of the flange 212 and opening toward the rear side.

An opening end 214 of the first tubular portion 211 protrudes from a front end face of the flange portion 212 toward the front side by a short distance. The opening end 214 has a substantially cylindrical shape, and a diameter of the opening end 214 is smaller than a diameter of the first tubular portion 211.

The recess 213 that opens toward the front side is defined in the housing 21 by the hood portion 215 on the front side of the flange portion 212, the opening end 214, and the front end face of the flange 212 (see FIGS. 3 and 4). In other words, the recess 213 is a groove whose bottom wall is the front end face of the flange portion 212 and whose side walls are the hood portion 215 and the opening end 214. The first portion 41 of the unit 5 is inserted into the recess 213.

The packing 28 is attached to an outer peripheral surface of the opening end 214. When the first portion 41 is inserted into the recess 213, the packing 28 seals a gap between an outer peripheral surface of an accommodating groove 231 and an inner peripheral surface of the first portion 41 (particularly, see FIG. 4).

The pair of second tubular portions 23 are provided on the front side of the flange portion 212. Each second tubular portion 23 has a substantially cylindrical shape, and a diameter of the second tubular portion 23 is smaller than the diameters of the first tubular portion 211 and the opening end 214 of the first tubular portion 211.

As illustrated in FIG. 4, each of the second tubular portions 23 is disposed on an inner peripheral side of the corresponding opening end 214 such that a rear end portion of the second tubular portion 23 is covered with the corresponding opening end 214. With respect to the first tubular portion 211 and the second tubular portion 23, an inner peripheral surface of the first tubular portion 211 and an outer peripheral surface of the second tubular portion 23 are spaced apart from each other. In other words, an annular gap is defined between the inner peripheral surface of the first tubular portion 211 and the outer peripheral surface of the second tubular portion 23. Further, a tubular hole of the first tubular portion 211 and a tubular hole of the second tubular portion 23 communicate with each other, and an electric wire 4 connected to the female terminal 22 is inserted through the communication portion of the tubular holes.

As illustrated in FIG. 6, the annular accommodating groove 231 is provided in the outer peripheral surface on the front side of each second tubular portion 23, and is recessed so as to have a reduced outer diameter over a circumferential direction. The conduction ring 30 made of a conductive material is attached in each accommodating groove 231. The conduction ring 30 is made of a conductive material, is formed by bending a strip-shaped conductive material, and has an annular shape in which a part is cut out in a circumferential direction. In other words, the conduction ring 30 has a substantially C-shape.

In the second tubular portion 23, a rotation restricting portion (not shown) is provided in the accommodating groove 231. The conduction ring 30 is attached in the accommodating groove 231 such that the rotation restricting portion is positioned at the part cut out in the circumferential direction of the conduction ring 30. Accordingly, after the conduction ring 30 is attached in the accommodating groove 231, the displacement in the circumferential direction (a rotation direction with the second tubular portion 23 as a central axis) is restricted.

When the fitting of the female connector 3 and the male connector 2 is completed, the conduction ring 30 comes into contact with and is electrically connected to the contact portion 15 of the male connector 2. Then, a conduction state between the male connector 2 and the female connector 3 is detected by the detection circuit connected to the contact portion 15.

The flange portion 212 further includes the fastening holes 216. Fastening members (not shown) are inserted through the fastening holes 216 when the female connector 3 is fastened and fixed to the unit 5.

As illustrated in FIG. 4, the female terminal 22 includes a fitting tubular portion 221 into which the male terminal 12 is inserted, and an electric wire connecting portion 222 electrically connected to a front end side end (that is, an exposed core wire 31) of the electric wire 4.

The fitting tubular portion 221 is a bottomed tube having a bottom wall 223 and opening to the front side, and has a substantially cylindrical shape. Similarly, the electric wire connecting portion 222 is a bottomed tube having the bottom wall 223 and opening to the rear side, and has a substantially cylindrical shape. The bottom wall 223 also serves as a bottom wall of the fitting tubular portion 221 and the electric wire connecting portion 222.

A shield shell 24 having a substantially cylindrical shape is attached to an outer periphery of the second tubular portion 23 from the front side toward the rear side. Specifically, the shield shell 24 is inserted into the annular gap defined between the inner peripheral surface of the first tubular portion 211 and the outer peripheral surface of the second tubular portion 23, and is attached to the second tubular portion 23. A plurality of cantilevered contact portions 25 protruding toward the front side are provided at a front end portion of the shield shell 24 (see also FIG. 6). Although indent portions are provided in the plurality of contact portions 25 in the present embodiment, the indent portions may not be provided in the contact portions 25. The plurality of contact portions 25 may be provided on an outer peripheral surface of the shield shell 24 at equal intervals.

Each contact portion 25 is formed by bending a strip-shaped conductive member so as to have a substantially V-shape. Specifically, the contact portion 25 includes a first portion that extends toward the front side from the front end portion of the shield shell 24 while being inclined upward, and a second portion that extends toward the front side while being inclined downward. Accordingly, a bent portion of the contact portion 25 (that is, a portion where the first portion and the second portion are continuous) is located on an outer side in a radial direction of the shield shell 24. In other words, the bent portion of the contact portion 25 is disposed so as to come into contact with the inner peripheral surface of the second portion 42 when the insertion of the female connector 3 into the hole portion 44 is completed. More specifically, a distance from the bent portion of the contact portion 25 to a central axis of the electric wire 4 is smaller than a radius of the first portion 41. Also, the distance from the bent portion of the contact portion 25 to the central axis of the electric wire 4 is larger than a radius of the second portion 42. When the insertion of the female connector 3 into the hole portion 44 is completed, the contact portion 25 comes into contact with the inner peripheral surface of the second portion 42 of the unit 5, and the female connector 3 and the unit 5 are ground-connected.

The electric wire 4 includes the core wire 31, an insulating coating 32 that covers an outer periphery of the core wire 31, a braided conductor 33 that covers an outer periphery of the insulating coating 32, a sheath 34 that covers an outer periphery of the braided conductor 33, and a shield ring 35. At the front end side end of the electric wire 4, the insulation coating 32 is peeled off to expose the core wire 31. A range of a predetermined length of the sheath 34, from a front end portion of a portion of the insulating coating 32 that covers the outer periphery of the core wire 31 (that is, a portion that is not peeled off), is removed. The shield ring 35 is attached to an outer periphery of a front end portion of the sheath 34 (that is, a portion where the sheath 34 is not removed). The insulating coating 32 corresponds to a “first insulating coating” of the present disclosure, the braided conductor 33 corresponds to a “shield member” of the present disclosure, and the sheath 34 corresponds to a “second insulating coating” of the present disclosure. Although the braided conductor 33 is used as the shield member in the present embodiment, a metal foil or the like may be used as the shield member as long as the metal foil or the like has a shield effect.

A front end face of the sheath 34 and a front end face of the shield ring 35 are configured to be positioned on the same plane in planes including the up-down direction and the left-right direction. The front end face of the sheath 34 and the front end face of the shield ring 35 are configured to be positioned on the same plane, and may not be positioned on the same plane due to design tolerance, manufacturing tolerance, or the like.

The braided conductor 33 is folded back from the front side to the rear side at a position where the front end portion of the sheath 34 and the front end portion of the shield ring 35 are positioned, and a folded portion 331 of the braided conductor 33 covers an outer periphery of the shield ring 35. In this way, a portion where the braided conductor 33, the sheath 34, the shield ring 35, and the folded portion 331 are covered (hereinafter, also referred to as a “crimped portion”) is crimped so as to be pressed on the core wire 31 and the insulating coating 32. The crimped portion is electrically connected to the shield shell 24 via a shield terminal 29 to be described later. The crimped portion and the shield shell 24 are spaced apart from each other in the front-rear direction.

The female connector 3 further includes the shield terminal 29 that electrically connects the shield shell 24 and the crimped portion. The shield terminal 29 has a substantially cylindrical shape, is attached to an outer periphery of the crimped portion and an outer periphery of the shield shell 24, and electrically connects the crimped portion and the shield shell 24.

Since the crimped portion is crimped, the crimped portion does not have a cylindrical shape. Therefore, even when the shield terminal 29 is attached, an outer peripheral surface of the crimped portion and an inner peripheral surface of the shield terminal 29 may not come into contact with each other, and the electrical connection may not be achieved. Therefore, a protruding contact portion (not shown) for electrically connecting to the outer peripheral surface of the crimped portion is provided on the inner peripheral surface of the shield terminal 29.

The electric wire 4 to which the female terminal 22 is attached is inserted into the housing 21, for example, from the rear side toward the front side. When the insertion of the female terminal 22 and the electric wire 4 into the housing 21 is completed, the female terminal 22 and a front end portion of the electric wire 4 are accommodated in the second tubular portion 23, and the crimped portion and a part of the electric wire 4 around the crimped portion are accommodated in the first tubular portion 211.

A packing 26 is attached on the rear side of a portion of each electric wire 4 that is accommodated in the first tubular portion 211. The packing 26 seals a gap between the first tubular portion 211 and the electric wire 4. A rear holder 27 is attached to a rear end portion (specifically, a portion on the rear side of the packing 26) of the electric wire 4 accommodated in the first tubular portion 211. The rear holder 27 is engaged with the packing 26 to prevent displacement of the packing 26 in the front-rear direction and the rotation direction.

The above is the description of the female connector 3.

Next, a connection process of the male connector 2, the female connector 3, and the unit 5 will be described. First, a rear end portion of the housing 11 of the male connector 2 is inserted into the hole portion 44 of the unit 5 from the front side toward the rear side. Then, the male connector 2 and the unit 5 are fastened and fixed by inserting the fastening members through the fastening holes 18 of the male connector 2 and the fastening holes (not shown) of the unit 5.

Next, the female connector 3 is disposed on the rear side of the unit 5, and the second tubular portion 23 of the female connector 3 is inserted into the hole portion 44 from the rear side toward the front side. When the female connector 3 is moved from the rear side toward the front side, the second tubular portion 23 enters the fitting groove 113 of the male connector 2. As described above, before the contact portion 25 comes into contact with the hole portion 44 (specifically, the second portion 42), the second tubular portion 23 enters the fitting groove 113, so that the displacement of the female connector 3 is restricted.

When the female connector 3 continues to move, the contact portion 25 enters the hole portion 44. Since the radius of the first portion 41 is configured to be larger than the distance from the bent portion of the contact portion 25 to the central axis of the electric wire, the contact portion 25 does not come into contact with the inner peripheral surface of the first portion 41 even if the female connector 3 continues to move. In other words, the contact portion 25 does not slide on the inner peripheral surfaces of the first portion 41 and the third portion 43 but comes into contact with the inner peripheral surface of the second portion 42 at a predetermined position.

For example, when the contact portion 25 and the inner peripheral surface of the first portion 41 slide against each other, the inner peripheral surface of the first portion 41 may be damaged. When the inner peripheral surface of the first portion 41 is damaged, a gap may be generated between the first portion 41 and the packing 28, and the performance of sealing between the female connector 3 and the unit 5 may be impaired. However, the connector connection structure 1 according to the present embodiment has excellent sealing performance because the contact portion 25 and the inner peripheral surface of the first portion 41 do not slide against each other.

Further, in the present embodiment, the pair of electric wires 4 has a pair of braided conductors 33 so as to correspond to each other. In other words, the braided conductors 33 cover the coated electric wires (the core wires 31 and the insulating coatings 32) so as to correspond to each other. Accordingly, the connector connection structure 1 according to the present embodiment has excellent shielding performance as compared with a case where one braided conductor 33 collectively covers a pair of coated electric wires (that is, a pair of core wires 31 and a pair of insulating coatings 32).

Further, when the contact portion 25 and the inner peripheral surface of the first portion 41 slide against each other, abrasion powder may be generated on the inner peripheral surface of the first portion 41. When the abrasion powder generated due to sliding adheres to the contact portion 25 or the inner peripheral surface of the second portion 42, the conduction state between the female connector 3 and the unit 5 may become unstable. However, in the connector connection structure 1 according to the present embodiment, since the contact portion 25 and the inner peripheral surface of the first portion 41 do not slide against each other, a stable conduction state is secured. The connector connection structure 1 according to the present embodiment is configured such that the contact portion 25 and the inner peripheral surface of the third portion 43 do not slide against each other.

When the female connector 3 continues to move, a rear end portion of the first portion 41 enters the recess 213. When the female connector 3 further continues to move, the second tubular portion 23, the female terminal 22, and the contact portion 25 reach predetermined positions. Specifically, the second tubular portion 23 reaches the wall portion 115 of the fitting groove 113, and the rear end portion of the insertion portion 122 of the male terminal 12 is inserted into the fitting tubular portion 221 of the female terminal 22. Then, the conductive connection between the female terminal 22 and the male terminal 12 is established via the spring 13, and the contact portion 25 comes into contact with the inner peripheral surface of the second portion 42 of the hole portion 44 and is ground-connected.

At this time, the first portion 41 is inserted into the recess 213. Accordingly, the connector connection structure 1 according to the present embodiment can prevent the displacement of the female connector 3 that may damage the inner peripheral surface of the hole portion 44 (particularly, the second portion 42) and the displacement of the female connector 3 that may cause the conduction state between the female connector 3 and the unit 5 to become unstable (for example, the displacement that causes the contact portion 25 to damage the inner peripheral surface of the second portion 42), even after the connection of the male connector 2, the female connector 3, and the unit 5 is completed.

As illustrated in FIGS. 3 and 4, in a completed state of the connection of the male connector 2, the female connector 3, and the unit 5, the crimped portion of the electric wire 4 including the braided conductor 33 is electrically connected to the shield shell 24, and the contact portion 25 abuts against the inner peripheral surface of the second portion 42, so that the braided conductor 33 and the unit 5 are ground-connected. Further, the core wire 31 of the electric wire 4 is electrically connected to the female terminal 22, and the female terminal 22 and the male terminal 12 are electrically connected to each other via the spring 13, so that the conductive connection between the core wire 31 and the male terminal 12 is established. Further, the conduction ring 30 and the contact portion 15 are electrically connected to each other.

The above is the description of the connection process of the male connector 2, the female connector 3, and the unit 5.

Since the connector connection structure 1 according to the present embodiment is configured as described above, the connector connection structure 1 has excellent sealing performance.

Other Embodiments

The present disclosure is not limited to the above-described embodiment, and modifications, improvements, and the like can be made as appropriate. In addition, materials, shapes, dimensions, numbers, arrangement positions, and the like of the constituent elements in the above-described embodiment are optional and not limited as long as the object of the present disclosure can be achieved.

As another embodiment, an example of a method of connecting the crimped portion and the shield terminal and connecting the shield terminal and the shield shell, which is different from that in the above-described embodiment, will be described with reference to FIGS. 7A to 10.

As illustrated in FIGS. 7A to 9B, in the other embodiment, similarly to the above-described embodiment, the electric wire 4 includes the core wire 31, the insulating coating 32 covering an outer periphery of the core wire 31, the braided conductor 33 covering an outer periphery of the insulating coating 32, the sheath 34 covering an outer periphery of the braided conductor 33, and the shield ring 35, and a front end side end of the electric wire 4 is electrically connected to the female terminal 22.

In the other embodiment, the core wire 31 and the insulating coating 32 are coated with the braided conductor 33, the sheath 34, the shield ring 35, the folded portion of the braided conductor 33, and a shield terminal 291 at a position corresponding to the crimped portion of the above-described embodiment. In the other embodiment, a shield shell *24a* is attached so as to cover the above covered portion. The shield terminal 29 is not crimped in the above-described embodiment, but in the other embodiment, the shield terminal 291 is also crimped.

Further, the sheath 34 and the shield shell 24 are electrically connected to each other via the shield terminal 29 in the above-described embodiment, but in the other embodiment, the shield shell *24a* is attached to and electrically connected to the shield terminal 291 in a manner of covering the shield terminal 291.

In this way, even if an attempt is made to electrically connect the crimped shield terminal and the shield shell, since the shield terminal has a shape different from a cylindrical shape due to the crimping, the electrical connection with the shield shell cannot be achieved by simply attaching the shield shell. For this reason, for example, a method of providing a protruding contact portion on an inner peripheral surface of the shield shell and bringing the protruding contact portion into contact with the outer peripheral surface of the shield terminal to achieve the electrical connection may be used. However, with such a method, a size of the shield shell is increased, and it is difficult to reduce the size of the shield shell.

On the other hand, in the other embodiment of the present disclosure, the shield terminal 291 is provided with a protruding conduction portion 291*a*, and the protruding conduction portion 291*a* is brought into contact with an inner peripheral surface of the shield shell 24*a*, thereby achieving the electrical connection.

Figure 10:
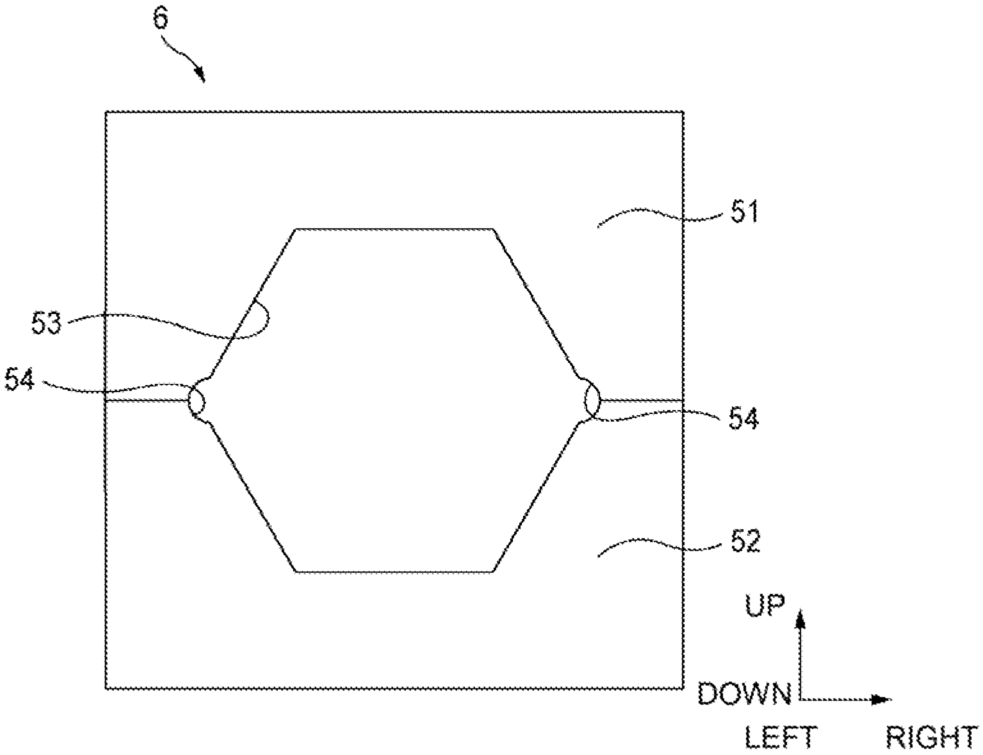
FIG. 10 is a front view of a crimping jig according to another embodiment.

A crimped portion 290 is crimped using a crimping jig 6. As illustrated in FIG. 10, the crimping jig 6 includes an upper member 51 and a lower member 52, and has a substantially cubic shape. In the crimping jig 6, when the upper member 51 and the lower member 52 abut each other in the up-down direction, a crimping accommodating portion 53 is defined substantially at a center thereof. The crimping accommodating portion 53 has a substantially hexagonal shape in a front view (cross-sectional view), and has a three-dimensional shape extending to a back side of the paper surface. A portion to be crimped (crimped portion 290) of the electric wire 4 is accommodated in a recess of the lower member 52 defining the crimping accommodating portion 53. When the upper member 51 is moved toward the lower member 52, the crimped portion 290 is crimped. Excess thickness adjustment portions 54 are provided at corner portions in the left-right direction of the crimping accommodation portion 53 respectively.

In general, when a portion covered with multiple layers is crimped, an excess thickness may be generated. In the other embodiment of the present disclosure, a protruding conductive portion 291*a* is formed by allowing the excess thickness, which is generated when the shield terminal 291 is crimped, to escape to the excess thickness adjustment portion 54 of the crimping jig 6.

Figure 8:
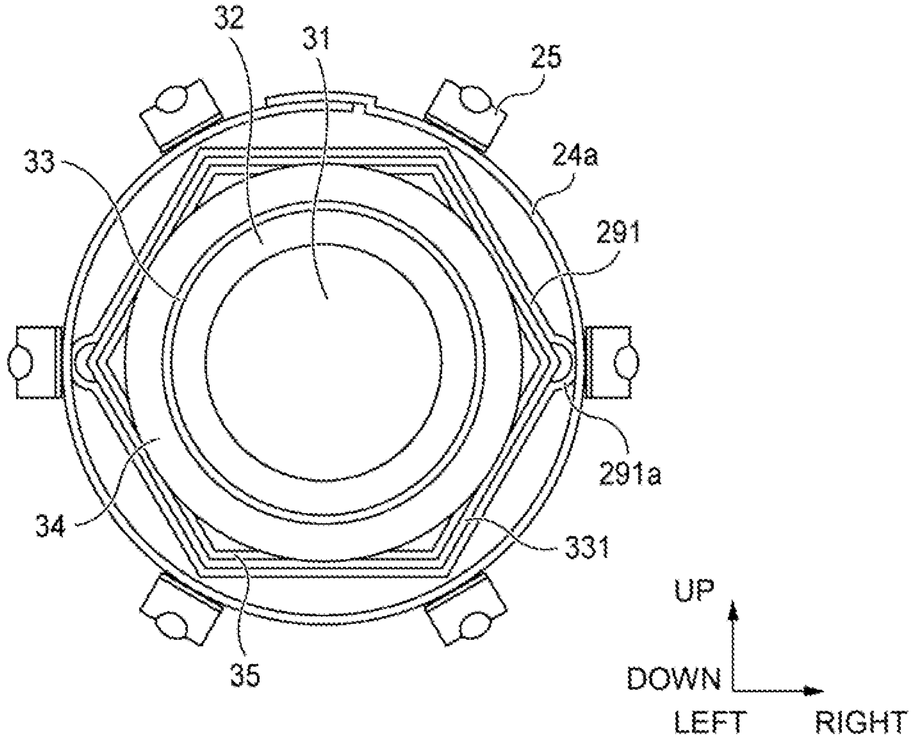
FIG. 8 is a front view of the wire harness in FIG. 7A as viewed from a rear side.
Figure 9A:
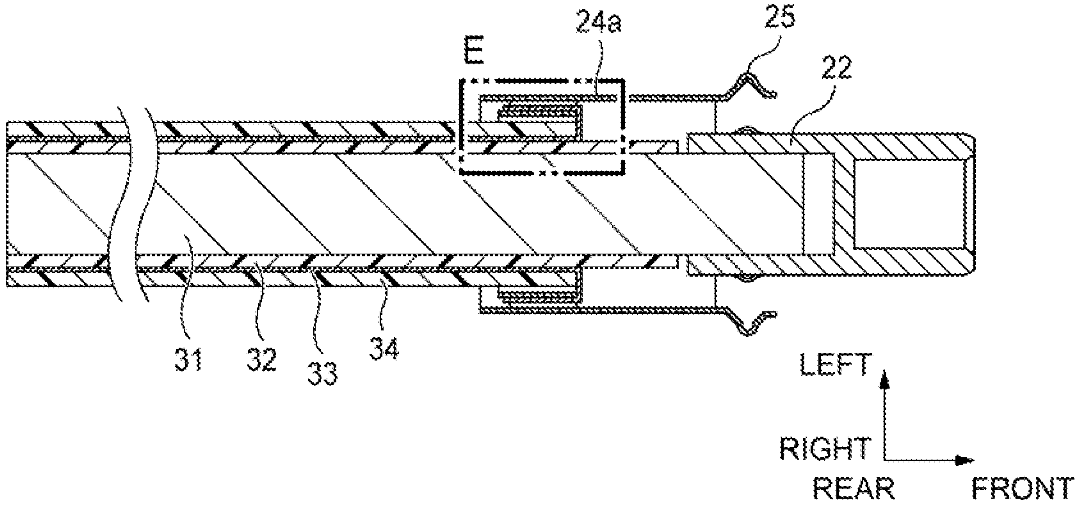
FIG. 9A is a cross-sectional view taken along a line D-D of FIG. 7A.
Figure 9B:
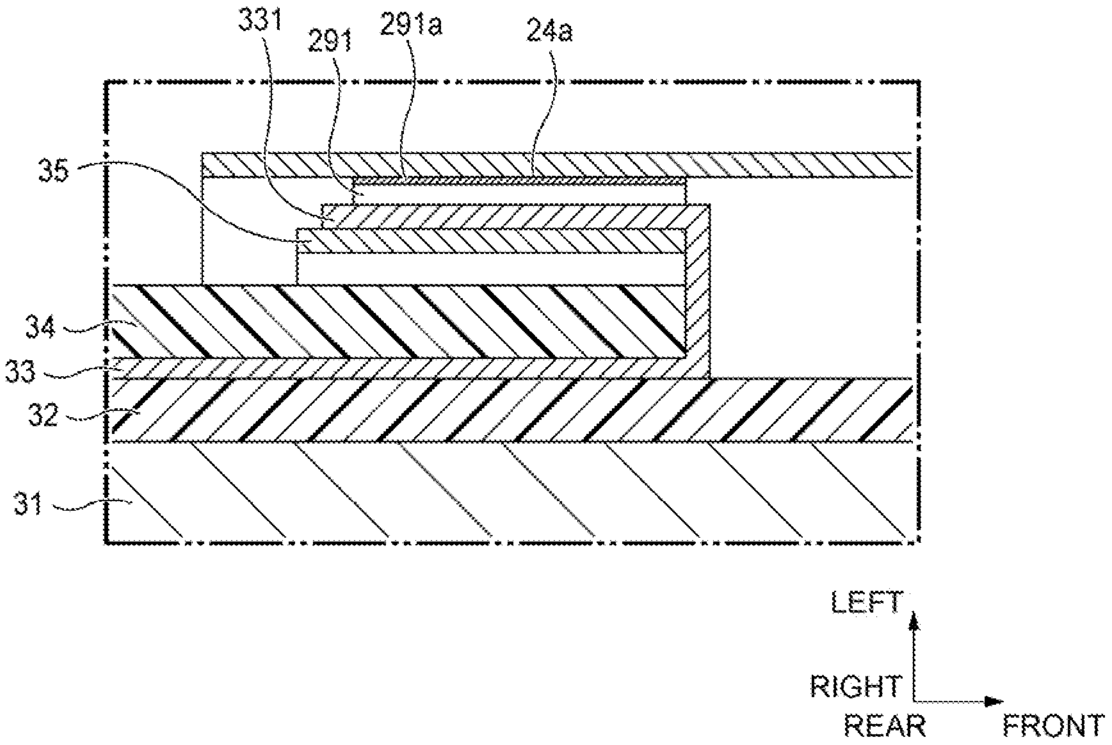
FIG. 9B is an enlarged view of a part E of FIG. 9A.

In particular, as illustrated, in FIG. 8, the protruding conductive portion 291*a* formed by the excess thickness adjustment portion 54 protrudes outward in a circumferential direction of the crimped portion, and is in contact with and electrically connected to the inner peripheral surface of the shield shell 24*a*. As described above, in the connector connection structure according to the other embodiment, the excess thickness that is not normally utilized is utilized. Accordingly, the shield terminal 291 and the shield shell 24*a* can be electrically connected to each other without deliberately providing a protruding contact portion or the like on the inner peripheral surface of the shield shell 24*a*. Further, the shield terminal 291 and the shield shell 24*a* can be electrically connected to each other without providing another member between the shield terminal 291 and the shield shell 24*a*. As a result, the size of the shield shell 24*a* can be reduced, and the number of components of the connector can be reduced, leading to cost reduction.

According to a first aspect of the present disclosure, a connector connection structure (1) includes: a first connector (female connector 3); a second connector (male connector 2) electrically connected to the first connector (3), a unit (5) to which the first connector is ground-connected; and a seal member (packing 28) configured to seal a gap between the first connector (3) and the unit (5). The unit (5) has a hole portion (44). The hole portion (44) includes a first portion (41) that is located on one side of the hole portion (44), and a second portion (42) that is located on the other side of the hole portion (44) with respect to the first portion (41) and the second portion (42) has a diameter smaller than a diameter of the first portion (41). The first connector (3) includes a terminal portion (female terminal 22) to be inserted into the hole portion (44), a housing (21) accommodating the terminal portion (22), an electric wire (4) to which the terminal portion (22) is connected at one end, and a shield shell (24) provided with a contact portion (25) having a contact part that is to abut an inner peripheral surface of the second portion (42), and is electrically connected to the second connector (2) via the hole portion (44). The electric wire (4) includes a core wire (31) connected to the terminal portion (22), a first insulating coating (insulating coating 32) covering an outer periphery of the core wire (31), a shield member (braided conductor 33) covering an outer periphery of the first insulating coating, and a second insulating coating (sheath 34) covering an outer periphery of the shield member (33) so that a pall of the shield member is exposed to an outside. The seal member (28) is positioned between the housing (21) and an inner peripheral surface of the first portion (41). In the connector connection structure, a radius of the first portion (41) is larger than a distance from a central axis of the electric wire (4) to the contact part of the contact portion (25) in a neutral state, the part of the shield member (33) exposed to the outside is connected to the shield shell (24), and the contact part of the contact portion (25) abuts the inner peripheral surface of the second portion (42), so that a around connection between the shield member (33) and the unit (5) is established. The core wire (31) is connected to the terminal portion (22) of the first connector (3) and the terminal portion (22) of the first connector (3) is connected to a terminal portion (12) of the second connector (2), so that the core wire (31) is electrically connected to the terminal portion (12) of the second connector (2).

The connector connection structure having the configuration of the first aspect will be described below. In the connector connection structure of this configuration, the radius of the first portion in the hole portion of the unit is larger than the distance from the central axis of the electric wire to the contact part of the contact portion in a neutral state in which the contact portion is not deformed by an external force (In this case, the neutral state is a state before the contact portion is deformed by contacting the second portion). Further, the diameter of the first portion is configured to be larger than the diameter of the second portion. Accordingly, when conductive connection between the first connector and the second connector is established (specifically, when a tubular portion and the terminal portion of the first connector are inserted straight into the hole portion of the unit), the contact portion of the shield shell and the inner peripheral surface of the first portion of the hole portion do not slide against each other. For example, when the contact portion and the inner peripheral surface of the first portion slide against each other, the inner peripheral surface of the first portion may be damaged. When the inner peripheral surface of the first portion is damaged, a gap may be generated between the first portion and the seal member externally attached to the tubular portion, and the performance of sealing between the first connector and the unit may be impaired. However, the connector connection structure of this configuration has excellent sealing performance because the contact portion and the inner peripheral surface of the first portion do not slide against each other as compared with a case where the contact portion and the inner peripheral surface of the first portion slide against each other.

Although the contact portion is configured not to come into contact with the inner peripheral surface of the first portion when the conductive connection between the first connector and the second connector is established, the contact portion may come into contact with the inner peripheral surface of the first portion in an unexpected situation (for example, by a defective method). However, it goes without saying that the case is acceptable.

Another effect of the connector connection structure of this configuration will be described below. The core wire whose outer periphery is covered with the first insulating coating in the electric wire is connected to the terminal portion of the first connector. When the terminal portion of the first connector is connected to the terminal portion of the second connector, the conductive connection between the core wire and the terminal portion of the second connector is established. Accordingly, the conductive connection between the first connector and the second connector is established. In addition, the part, of the shield member covered with the second insulating coating, exposed to the outside in the electric wire is connected to the shield shell of the first connector. The contact portion of the shield shell comes into contact with the inner peripheral surface of the second portion of the hole portion of the unit, so that the shield member and the unit are ground-connected. Accordingly, the first connector is ground-connected to the unit. That is, the connector connection structure of this configuration is also excellent in shielding performance.

Another effect of the connector connection structure of this configuration will be described below. Generally, when the contact portion and the inner peripheral surface of the first portion slide against each other, abrasion powder may be generated on the inner peripheral surface of the first portion. When the abrasion powder generated due to sliding adheres to the contact portion or the inner peripheral surface of the second portion, the conduction state between the first connector and the unit may become unstable. That is, in the connector connection structure of this configuration, since the contact portion and the inner peripheral surface of the first portion do not slide against each other, a stable conduction state is secured.

According to a second aspect of the present disclosure, the hole portion (44) includes a third portion (43) that is located between the first portion (41) and the second portion (42) and has a diameter decreasing from the one side toward the other side of the hole portion (44).

According to the connector connection structure having the configuration of the second aspect, the same effect as that of the first aspect is obtained.

According to a third aspect of the present disclosure, die terminal portion (female terminal 22) of the first connector is electrically connected to the terminal portion (male terminal 12) of the second connector before the contact portion (25) abuts the inner peripheral surface of the second portion (42).

The connector connection structure having the configuration of the third aspect will be described below. The conductive connection between the terminal portion of the first connector and the terminal portion of the second connector is established before the contact portion comes into contact with the inner peripheral surface of the second portion. Accordingly, in the connector connection structure of this configuration, even when displacement of the first connector is restricted and prying occurs in a rotation direction (a direction in which the terminal portion of the first connector rotates with a direction in which the terminal portion of the first connector is inserted into the hole portion of the unit as a central axis), the contact portion is not in contact with the second portion, and thus an unstable conduction state between the first connector and the unit, which is likely to occur due to the prying, can be prevented.

According to a fourth aspect of the present disclosure, one of the housing (21) and the unit (5) has a protrusion (first portion 41), the other of the housing (21) and the unit (5) has a recess (213), and the protrusion (41) is inserted into the recess (213).

The connector connection structure having the configuration of the fourth aspect will be described below. One of the housing and the unit has a protrusion, and the other of the housing and the unit has a recess into which the protrusion is inserted. Accordingly, even after connection of the first connector, the second connector and the unit is completed, the displacement of the first connector (for example, displacement that causes the contact portion to damage the inner peripheral surface of the hole portion) that may cause the conduction state between the first connector and the unit to become unstable can be prevented.

According, to a fifth aspect of the present disclosure, the first connector (female connector 3) includes a metal layer (shield terminal 291) covering art outer periphery of the second insulating coating (sheath 33). The metal layer (291) includes a protruding portion (protruding conduction portion 291*a*) protruding outward in a radial direction of the electric wire (4). In the connector connection structure, the part of the shield member (braided conductor 33) exposed to the outside is connected to the metal layer (291), and the protruding portion (291*a*) abuts an inner peripheral surface of the shield shell (24*a*), so that the shield member (33) and the shield shell (24*a*) are connected to each other.

The connector connection structure having the configuration of the above fifth aspect will be described below. The part of the shield member, which is exposed to the outside, is connected to the metal layer covering the outer periphery of the second insulating coating. The protruding portion of the metal layer, which protrudes outward in the radial direction, abuts the inner peripheral surface of the shield shell, so that the shield member and the shield shell are connected to each other. Accordingly, in the connector connection structure of this configuration, the metal layer and the shield shell are connected without using another member. Thus, the number of components is reduced and the cost is reduced accordingly.

According to a sixth aspect of the present disclosure, a center axis of the first portion (41) and a center of the second portion (42) coincide each other.

According to a seventh aspect of the present disclosure, the first portion (41) has an annular shape and is a protrusion protruding toward a rear side. The second portion (42) has an annular shape and is a protrusion protruding toward a front side.

According to an eighth aspect of the present disclosure, the hole portion (44) of the unit (5) penetrates in a front-rear direction According to a ninth aspect of the present disclosure, the contact portion (25) and other contact portion (25) are provided on an outer peripheral surface of the shield shell (24) at equal intervals

What is claimed is:

1. A connector connection structure comprising:

a first connector;

a second connector electrically connected to the first connector;

a unit to which the first connector is ground-connected; and a seal member configured to seal a gap between the first connector and the unit, wherein the unit has a hole portion, wherein the hole portion includes a first portion that is located on one side of the hole portion, and a second portion that is located on the other side of the hole portion with respect, to the first portion and the second portion has a diameter smaller than a diameter of the first portion, wherein the first connector includes a terminal portion to be inserted into the hole portion, a housing accommodating the terminal portion, an electric wire to which the terminal portion is connected at one end, and a shield shell provided with a contact portion having a contact part that is to abut an inner peripheral surface of the second portion, and is electrically connected to the second connector via the hole portion, wherein the electric wire includes a core wire connected to the terminal portion, a first insulating coating covering an outer periphery of the core wire, a shield member covering an outer periphery of the first insulating coating, and a second insulating coating covering an outer periphery of the shield member so that a part of the shield member is exposed to an outside, wherein the seal member is positioned between the housing and an inner peripheral surface of the first portion, and wherein in the connector connection structure, a radius of the first portion is larger than a distance from a central axis of the electric wire to the contact part of the contact portion in a neutral state, the part of the shield member exposed to the outside is connected to the shield shell, and the contact part of the contact portion abuts the inner peripheral surface of the second portion, so that a ground connection between the shield member and the unit is established, and the core wire is connected to the terminal portion of the first connector and the terminal portion of the first connector is connected to a terminal portion of the second connector, so that the core wire is electrically connected to the terminal portion of the second connector.

2. The connector connection structure according to claim 1, wherein the hole portion includes a third portion that is located between the first portion and the second portion and has a diameter decreasing from the one side toward the other side of the hole portion.

3. The connector connection structure according to claim 1, wherein the terminal portion of the first connector is electrically connected to the terminal portion of the second connector before the contact portion abuts the inner peripheral surface of the second portion.

4. The connector connection structure according to claim 1, wherein one of the housing and the unit has a protrusion, the other of the housing and the unit has a recess, and the protrusion is inserted into the recess.

5. The connector connection structure according to claim 1, wherein the first connector includes a metal layer covering an outer periphery of the second insulating coating, wherein the metal layer includes a protruding portion protruding outward in a radial direction of the electric wire, and wherein in the connector connection structure, the part of the shield member exposed to the outside is connected to the metal layer, and the protruding portion abuts an inner peripheral surface of the shield shell, so that the shield member and the shield shell are connected to each other.

6. The connector connection structure according to claim 1, wherein a center axis of the first portion and a center of the second portion coincide each other.

7. The connector connection structure according to claim 1, wherein the first portion has an annular shape and is a protrusion protruding toward a rear side, and wherein the second portion has an annular shape and is a protrusion protruding toward a front side.

8. The connector connection structure according to claim 1, wherein the hole portion of the unit penetrates in a front-rear direction.

9. The connector connection structure according to claim 1, wherein the contact portion and other contact portion are provided on an outer peripheral surface of the shield shell at equal intervals.

* * * * *